United States Patent
Nivet

[19]

[11] Patent Number: 5,868,370
[45] Date of Patent: Feb. 9, 1999

[54] FIXING DEVICE, FASTENING SUPPORT INCORPORATING IT, AND ITS USE FOR A VEHICLE SUN VISOR

[75] Inventor: André Nivet, Beauchamp, France

[73] Assignee: ITW De France, Beauchamp, France

[21] Appl. No.: 960,283

[22] Filed: Oct. 29, 1997

[30] Foreign Application Priority Data

Nov. 25, 1996 [FR] France .................................. 96 14367

[51] Int. Cl.$^6$ ...................................................... F16B 45/00
[52] U.S. Cl. ........................... 248/304; 296/97.9; 411/41
[58] Field of Search .............................. 248/304, 222.12, 248/278, 309.1; 296/97.9; 411/48, 41, 45, 38

[56] References Cited

U.S. PATENT DOCUMENTS

| | | | |
|---|---|---|---|
| 3,143,916 | 8/1964 | Rice ........................................... | 411/37 |
| 4,580,936 | 4/1986 | Francis et al. ............................. | 411/38 |
| 4,828,439 | 5/1989 | Giannuzzi .................................. | 411/37 |
| 5,358,299 | 10/1994 | Seto ........................................ | 296/97.9 |
| 5,397,088 | 3/1995 | White .................................. | 248/309.1 |
| 5,411,310 | 5/1995 | Viertel et al. ........................... | 296/97.9 |
| 5,507,545 | 4/1996 | Krysiak ................................... | 296/97.9 |
| 5,560,669 | 10/1996 | Gute ....................................... | 296/97.9 |
| 5,567,098 | 10/1996 | Gordon .................................... | 411/48 |
| 5,765,896 | 6/1998 | Grisval ................................... | 296/97.9 |

FOREIGN PATENT DOCUMENTS

| | | |
|---|---|---|
| 2336583 | 7/1977 | France . |
| 24429987 | 6/1980 | France . |
| 622288 | 4/1949 | United Kingdom . |

Primary Examiner—Leslie A. Braun
Assistant Examiner—Anita M. King
Attorney, Agent, or Firm—Schwartz & Weinrieb

[57] ABSTRACT

The device comprises a foot (7) equipped with two pairs of mutually opposite lugs (10A, 10B, 12A, 12B) one of which carries a crosspiece (11) having a portion (18) in the form of a wedge which points towards a slot situated between the lugs (12A, 12B) of the other pair, the crosspiece (11) having a body (17) in which a housing (19) is formed for a metal nut (4) with which the threaded metallic shank of a screw (3) engages, the screw (3) serving to drive the crosspiece (11) towards the base member (5) so that the lugs (10A, 10B) of the first pair flex while the wedge (18) causes the lugs (12A, 12B) of the other pair to bend outwards.

The fastening support (1) also comprises a hook (6) provided for the pivot of a sun visor.

18 Claims, 3 Drawing Sheets

FIXING DEVICE, FASTENING SUPPORT INCORPORATING IT, AND ITS USE FOR A VEHICLE SUN VISOR

FIELD OF THE INVENTION

The invention relates generally to fixing devices, and more particularly to devices for fixing an element of any type on a carrier element.

BACKGROUND OF THE INVENTION

From FR-A-2.442.987 a device of the aforenoted type is already known which comprises a foot which is introduced into an opening of standard shape in a carrier element, the foot being equipped with two pairs of mutually opposite lugs, one of which comprises a crosspiece in the form of a wedge which points towards a slot located between the lugs of the other pair, the blocking of the fixing device on the carrier element being effected by manipulating a rod which moves the crosspiece so that the wedge penetrates into the slot and the pair of lugs carried by the crosspiece flex while the other pair of lugs are caused to bend outwards by the wedge.

In general the crosspiece is controlled by means of a screw with a self-cutting threaded shank with which it co-operates.

This type of device is highly regarded because it provides a high quality fixation because each of the four lugs deforms outwards during the fixing step, because it is suitable for a carrier element the thickness of which may vary over a relatively large range, and lastly because this type of device can usually be removed without any part remaining in the carrier element.

OBJECT OF THE INVENTION

The invention aims to increase the possibilities for using this type of device.

SUMMARY OF THE INVENTION

For this purpose the present invention provides a device for fixing a first element onto a second element comprising:
- a base member adapted to bear on a surface surrounding an aperture of predetermined shape in the second element;
- a foot carried by the base member adapted to be inserted in the aperture in the second element, comprising a first pair of mutually opposite lugs extending from the base member, a crosspiece disposed between the lugs of the first pair, and a second pair of mutually opposite lugs, each connected exclusively to the base member and separated by a slot, with the crosspiece being opposite the lugs of the second pair and comprising a wedge pointing towards the slot, with the lugs of the first pair being adapted to flex when the crosspiece is driven towards the base member and with the lugs of the second pair being adapted to fold outwards when the wedge of the said crosspiece penetrates the slot; and
- a shank passing through a bore formed through the base member and between the lugs of the said second pair and engaging with the crosspiece in order to drive the latter towards the base member;

characterized in that:
- the crosspiece is made of plastic, it has a body from which the wedge extends, and a housing is formed in the body;
- the shank is metallic and threaded; and
- the said device also comprises, inserted in the said housing, a metal nut in which the shank is engaged.

The presence of the metal screw allows the fixing device to be compatible with much larger torques for tightening the threaded shank than those which could be withstood by the previous device in which the threaded rod engaged by self-cutting in the crosspiece in the form of a wedge.

It will be noted that in the device in accordance with the invention, the screw does not engage with the crosspiece in the wedge region, but with an element which the crosspiece comprises in addition to the wedge, this element housing the nut with which the threaded shank co-operates.

According to preferred characterizing features, at least one lug of the first pair has a portion convex on the outside.

This convex shape means that a deformation of the lug is necessary in order to insert the foot in the opening in the second element, which makes it possible to obtain a temporary retention in position.

Preferably the portion which is convex on the outside has a constant thickness.

The part of the lug which is convex towards the outside thus has a generally curved shape which favors flexing outwards when the crosspiece is driven towards the base member.

The force needed to begin to flex the lug is thus relatively small, and this is particularly useful in the case where the threaded shank is driven by a screwdriver with an automatic clutch.

It will be noted in this regard that the metal on metal friction between the threaded shank and the nut necessitates a relatively high starting torque, and so it is necessary that it should be possible to make at least one of the lugs of the first pair flex relatively easily in order to avoid the risk of declutching of the screw driver before the crosspiece has even begun to be driven towards the base member.

Preferably, also, the portion which is convex on the outside is situated at a predetermined distance from the base member.

This predetermined distance corresponds, in particular, to the thickness of the second element, in the case where the latter is relatively thin, the generally curved portion being located entirely behind the second element once the foot has been introduced into the aperture of predetermined shape in the latter.

According to other preferred characteristics, at least one lug of the second pair has an external surface transverse to the slot which has a sloping portion which intersects the side wall of the bore through which the shank passes.

The width of this lug therefore decreases greatly towards its free end, so that it is proportionately easier for the wedge to bend the lug the less deeply it is inserted into the slot.

Therefore the force required to make the wedge penetrate into the slot is progressive, which also is particularly useful in the case where the threaded shank is driven by a screwdriver with an automatic clutch.

In this way the risk is in fact minimized that the screwdriver will declutch before the wedge is sufficiently inserted into the slot.

Preferably the sloping portion of the external surface intersects the side wall of the said bore in front of the free end of the lug.

There thus exists towards the end of the slot a sort of bevel which facilitates the entry of the wedge into the slot.

Preferably, also, the sloping portion is situated at a predetermined distance from the base member.

In particular, in the case where the predetermined distance corresponds to the thickness of the second element, it is only the part of the lug having a variable thickness, because of the sloping portion, which bends under the force of penetration by the wedge, the value given to the slope of the inclined portion making it possible to control the progressiveness of the force required to make the wedge enter into the slot.

It is always preferable, again in order to control the force needed to drive in the wedge, that the overall thickness of the lugs of the second pair be constant.

In a preferred embodiment, combining the preferred characteristics described above, and thus enabling an excellent progressiveness of the torque for driving the threaded shank:

each lug of the first pair comprises, at a predetermined distance from the base member, a portion, convex on the outside, of constant thickness, and each lug of the second pair comprises, in each external surface transverse to the slot, at the predetermined distance from the base member, a sloping portion which intersects the side wall of the bore through which the shank passes.

According to other preferred characteristics, the body has a conical external shape pointing away from the base member.

In view of this shape, the insertion of the foot into the aperture is particularly easy, and may in fact be performed automatically.

The invention also envisages, as a second objective, a fastening support comprising a fixing device such as has been described above and a hook opposite the foot. It also envisages, as a third more specific objective, the use of a device such as has been described above in a fastening support of a vehicle sun-visor.

BRIEF DESCRIPTION OF THE DRAWINGS

The invention will now be explained in more detail by the following description of an embodiment, given by way of a non-limiting example, with reference to the attached drawings in which like reference characters designate like or corresponding parts throughout the several views, and wherein.

DETAILED DESCRIPTION OF THE ILLUSTRATED EMBODIMENTS

The fastening support 1 shown in FIGS. 1 to 4 comprises an element 2 made of plastic and molded in a single piece, a metal screw 3 and a metal nut 4.

Figure 1:
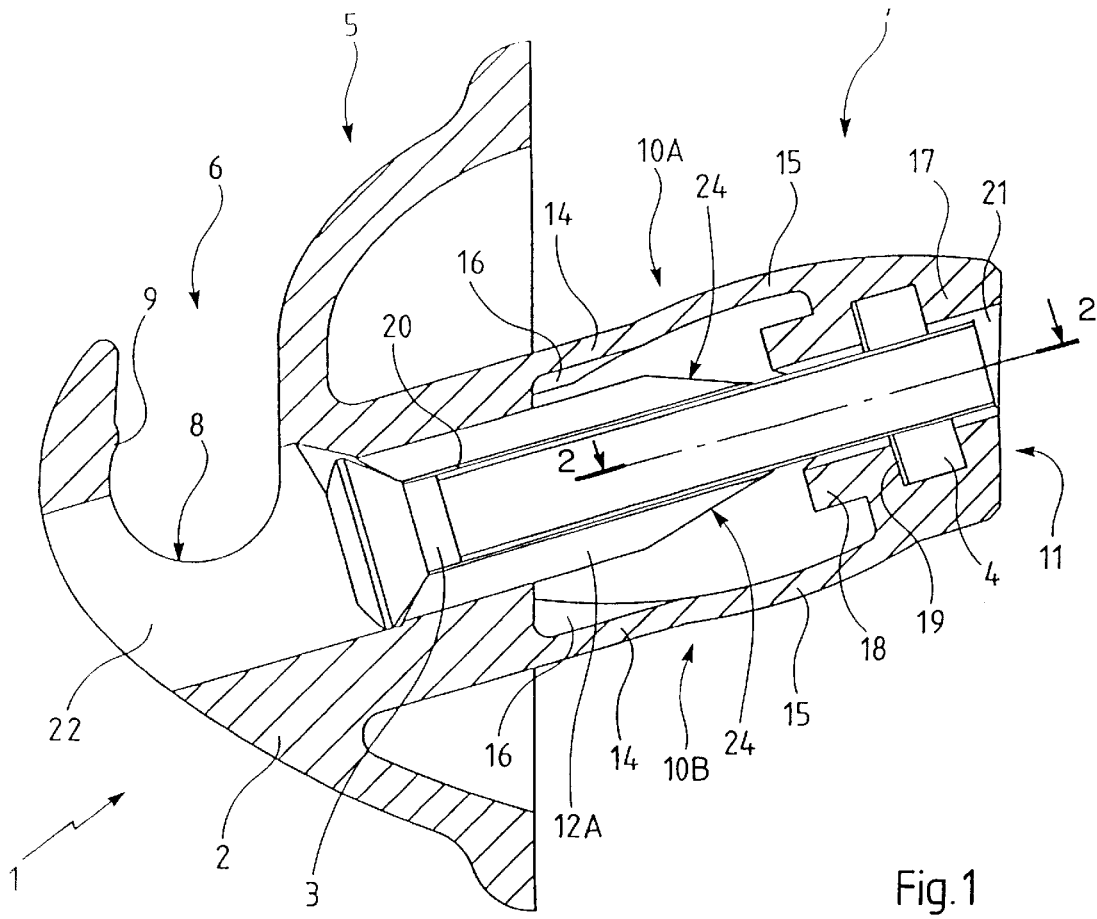
FIG. 1 is an elevation view of a cross-section of a fastening support for a vehicle sun visor comprising a device in accordance with the invention.
Figure 3:
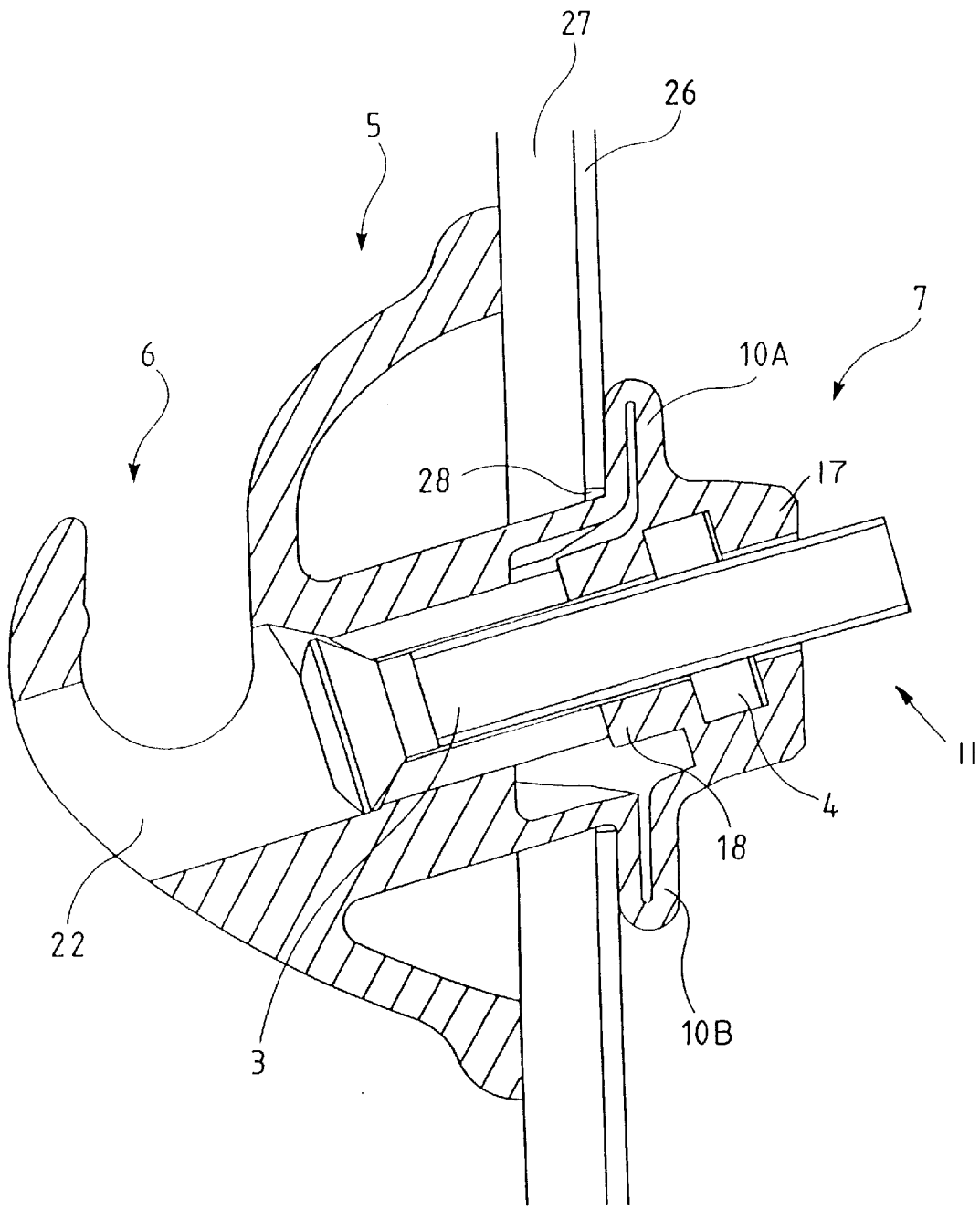
FIG. 3 is a view similar to FIG. 1 but showing a fastening support fixed to a metal beam of a vehicle covered by a decorative panel.
Figure 4:
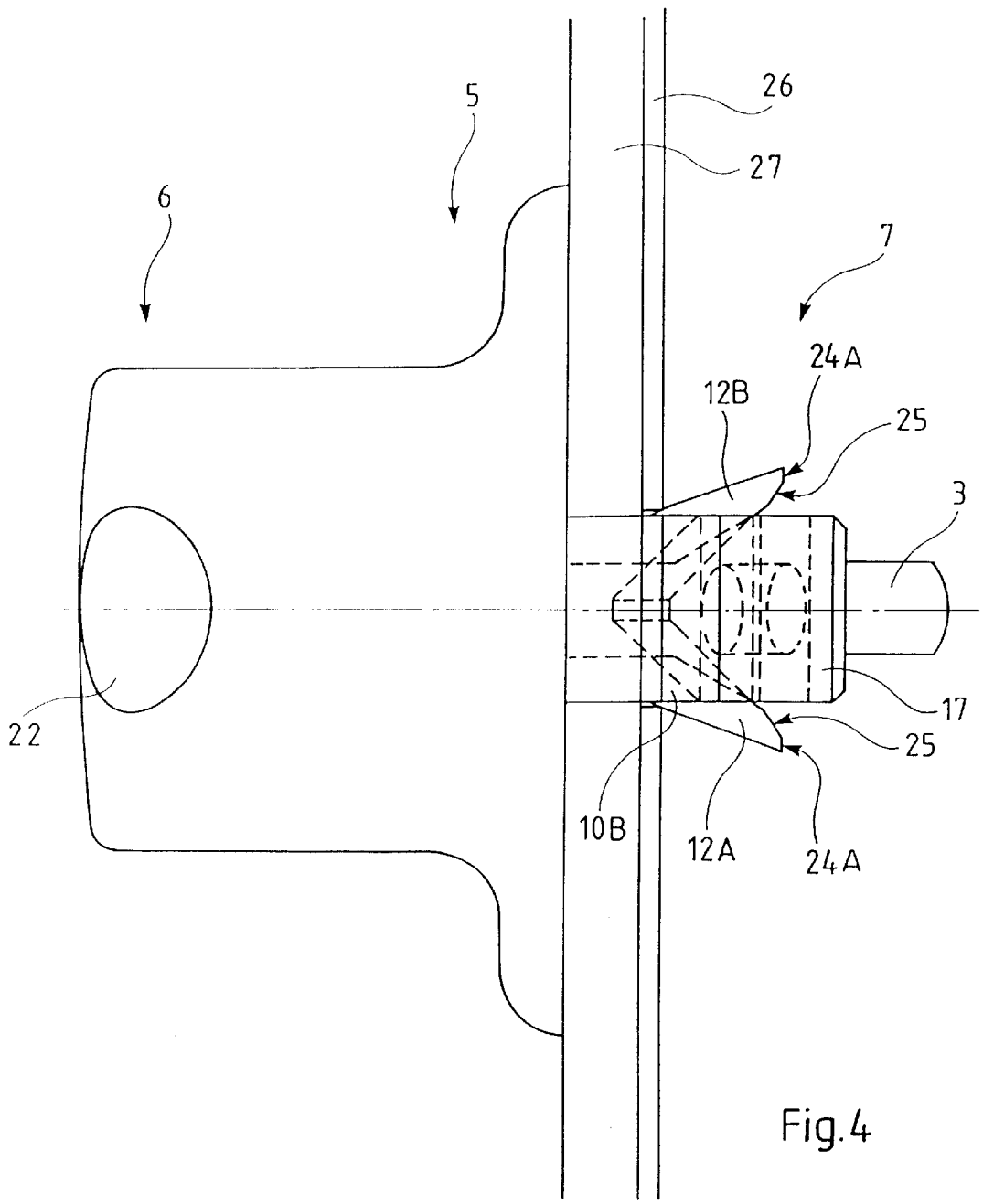
FIG. 4 is a view from below corresponding to FIG. 3.

The element 2 comprises a base member 5 carrying a hook 6 on the side which is seen on the left in FIGS. 1, 3 and 4 and a fixing foot 7 on the side seen on the right.

The hook 6 is provided to receive in a removable manner a pivot bar of a vehicle sun visor. The surface at the bottom 8 of the hook 6 is semi-circular and has the same diameter as the pivot bar to be held and a thickened portion 9 is provided above the bottom surface 8 so as to retain the pivot bar.

Figure 2:
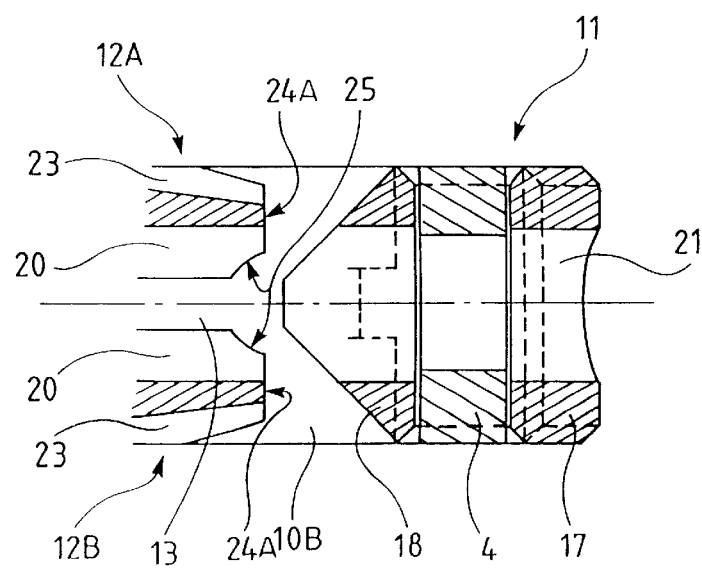
FIG. 2 is a partial view in cross-section along the line marked 2—2 FIG. 1.

The foot 7 comprises two pairs of mutually opposite lugs extending from the base member 5. These are, respectively, a pair of lugs 10A and 10B between which there is a crosspiece 11 and a pair of lugs 12A and 12B which are each exclusively connected to the base member 5 and are separated by a slot 13 (FIG. 2).

Each of the lugs 10A and 10B comprises a rectilinear portion 14 and a curved portion 15.

Each of the portions 14 has a length such that it extends over a fixed distance from the base member 5, this distance being measured transversely to the base member 5 and corresponding to the thickness of the carrier element 26, 27 on which the support 1 will be fixed (see FIG. 3). In the case of each of the lugs 10A and 10B a reinforcing rib 16 is provided between the base member 5 and the internal surface of the rectilinear portion 14.

Each of the curved portions 15, located between a portion 14 and the crosspiece 11, is convex on the outside and has a constant thickness.

The crosspiece 11 comprises a body 17 connected directly to the lugs 10A and 10B and a wedge 18 extending from the body 17 with the wedge 18 pointing towards the slot 13 which exists between the lugs 12A and 12B.

A housing 19 is defined in the body 17, the nut 4 being inserted in the housing.

To enable the shank of the screw 3 to engage in the nut 4, a bore 20 is formed in the base member 5 and in the lugs 12A and 12B and a similar coaxial bore 21 is formed in the crosspiece 11.

To enable the head of the screw 3 to be positioned near the base member 5, a bore 22 coaxial with, but of larger diameter than, the bores 20 and 21 is formed in the hook 6 and to a fixed depth in the base member 5.

The thickness of the lugs 12A and 12B (that is to say their dimension which is directed vertically in FIG. 2) is in a general manner constant, it being understood that in the inside there is a hollow corresponding to the bore 20, while on the external surface directed parallel to the slot 13 grooves 23 are made facilitating the engagement of the lugs 12A and 12B with the carrier element 26–27 to which the support 1 is to be fixed.

As can be seen in FIG. 1 in the case of the lug 12A (the same applies in the case of the lug 12B), each of the external surfaces of the lug 12A directed transversely to the slot 13 comprises, at the same distance from the base member 5 as the portions 15 of the lugs 10A and 10B, a sloping portion 24 which intersects the side wall of the bore 20 in front of the free end 24A of the lug 12A, and this produces a sort of bevel 25. Given that each of the external surfaces of each of the lugs 12A and 12B transverse to the slot 13 comprises a sloping portion 24, there are four of the bevel-like surfaces 25 each forming a centering surface oriented towards the slot 13.

The carrier element on which it is intended to fix the support 1 comprises, (see FIGS. 3 and 4) a hollow metallic beam 26 and a decorative panel 27 which covers the hollow metallic beam 26, a rectangular hole 28 corresponding to the overall cross-section of the foot 7 being made in the panel 27 and the beam 26.

To fix the support 1, the foot 7 is inserted in the hole 28 until the base member 5 bears against the surface of the decorative panel 27 surrounding the opening 28.

This insertion is made possible because of the flexing of the curved portions 15 of the lugs 10A and 10B, which flex inwards so as to allow their passage through the opening 28, the portions 15 then expanding so that they provide a temporary retention in position.

Then a tool for rotating the screw 3 is inserted in the bore 22, and the tool is engaged with the head of the screw 3 so as to rotate the latter in the direction in which it drives the crosspiece 11 towards the base member 5 by means of the threaded engagement of the screw 3 with nut 4.

The portions 15 of the lugs 10A and 10B then bend outwards (their curvature constitutes a commencement of bending in this direction), the wedge 18 approaches the blades or lugs 12A and 12B and then encounters the bevel-like surfaces 25 which produce a mutual centering, then the wedge penetrates into the slot 13 properly speaking so that the lugs 12A and 12B fold outwards, the flexing of the lugs 10A and 10B and the folding of the lugs 12A and 12B continuing as long as the screw 3 is driven in rotation, the driving tool declutching when a predetermined torque is reached at which the deformation is sufficient for the fixing of the support 1 to be effected correctly. The position shown in FIGS. 3 and 4 has then been reached in which the foot 7 engages securely behind the beam 26 by means of each of its four lugs 10A, 12A, 10B and 12B.

It will be seen that the sloping portions 24 of the lugs 12A and 12B cause the width of these lugs (dimension directed transversely to the axis of the screw 3 in FIG. 1) to increase progressively towards the base member 5 over a distance corresponding approximately to that over which the lugs 12A and 12B are free behind the beam 26. As a result the force necessary for inserting the wedge 18 in the slot 13 increases progressively as it is inserted further. Moreover, the presence of the bevel-like surfaces 25 ensures that in the case of a faulty alignment of the wedge 18 and the slot 13 no hard spot will be reached which might cause declutching of the tool driving the screw 3 before the wedge 18 has penetrated sufficiently into the slot 13.

Figure 5:
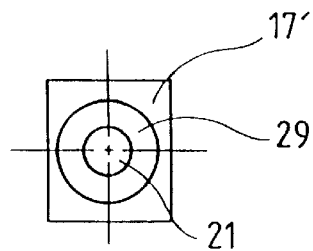
FIG. 5 is a diagrammatic view of the end of the foot of the fixing device in an alternative fastening support embodiment.

In the alternative embodiment shown in FIG. 5, the body 17 in the crosspiece 11 with a flat end and a rectangular contour is replaced by a body 17' ending in an external conical shape 29 pointing away from the base member 5. The external conical shape 29 makes it possible to position the support 1 easily with regard to the aperture 28 in the carrier element 26, 27.

In a, not shown, alternative embodiment, the foot 7 is directed transversely to the base member 5 instead of being inclined relative to the latter. In another, not shown, alternative embodiment, small thickened portions are provided on the external surfaces of the portions 15, in order to procure a better temporary holding in position (the temporary holding in place can also be used to position the support 1 relative to the decorative panel 27, the latter and the support 1 being installed relative to the beam 26 simultaneously).

Numerous other alternatives are possible depending on the circumstances, and in particular some, or even all, of the sloping portions 24 of the lugs 12A and 12B may be omitted, and the same applies for the curved portions 15, in particular when the fixing foot 7 must be used on a carrier element 26, 27 thicker than the length of the foot 7.

More generally, it will be recalled that the invention is not limited to the examples described and shown. It is therefore to be understood that within the scope of the appended claims, the present invention may be practiced otherwise than as specifically described herein.

I claim:

1. A device for fixing an element upon a support panel, comprising:

a base member having a support portion for engaging a first surface of a support panel, and a first pair of oppositely disposed lugs having a slot defined therebetween;

a foot portion integral with said base member and extending axially away from said base member so as to be adapted to be inserted through an aperture defined within the support panel;

said foot portion comprising a cross-piece and a second pair of oppositely disposed lugs integrally connected at first ends thereof to said base member and integrally connected at second opposite ends thereof to said cross-piece such that when said cross-piece is moved axially toward said base member, said second pair of oppositely disposed lugs will be expanded radially outwardly so as to engage a second surface of the support panel, said cross-piece also being disposed opposite said first pair of oppositely disposed lugs and comprising a wedge member pointedly extending toward said slot defined between said first pair of oppositely disposed lugs such that when said cross-piece is moved axially toward said base member, said wedge member will enter said slot defined between said first pair of oppositely disposed lugs and cause said first pair of oppositely disposed lugs to be moved radially outwardly so as to also engage the second surface of the support panel;

a fastener having a threaded shank portion extending through said base member and between said first pair of oppositely disposed lugs;

a cavity defined within said cross-piece; and nut means disposed within said cavity of said cross-piece for threadedly engaging said threaded shank portion of said fastener, whereupon rotation of said fastener and threaded engagement of said fastener and said nut means, said cross-piece of said foot portion will be caused to move axially toward said base member whereby said second pair of oppositely disposed lugs will be expanded radially outwardly, and said wedge member will be moved into said slot defined between said first pair of oppositely disposed lugs so as to force said first pair of oppositely disposed lugs to be moved radially outwardly.

2. The device as set forth in claim 1, wherein:

said base member comprising said support portion and said first pair of oppositely disposed lugs, and said foot portion comprising said cross-piece, said wedge member, and said second pair of oppositely disposed lugs, comprise a one-piece plastic molded component.

3. The device as set forth in claim 1, wherein:

said fastener and said nut means comprise metallic components.

4. The device as set forth in claim 1, wherein:

each one of said second pair of oppositely disposed lugs comprises an external convexly curved portion which predisposes said second pair of oppositely disposed lugs toward said radially outward expansion thereof.

5. The device as set forth in claim 4, wherein:

said external convexly curved portions of said second pair of oppositely disposed lugs have a constant thickness dimension.

6. The device as set forth in claim 1, further comprising:

a hook member integrally connected to said base member for supporting an element to be mounted upon the support panel.

7. In combination, a support system for mounting an element, comprising:

a support panel having an aperture defined therein;

a base member having a support portion for engaging a first surface of said support panel, and a first pair of oppositely disposed lugs having a slot defined therebetween;

a foot portion integral with said base member and extending axially away from said base member so as to be inserted through said aperture defined within said support panel;

said foot portion comprising a cross-piece and a second pair of oppositely disposed lugs integrally connected at first ends thereof to said base member and integrally connected at second opposite ends thereof to said cross-piece such that when said cross-piece is moved axially toward said base member, said second pair of oppositely disposed lugs will be expanded radially outwardly so as to engage a second surface of said support panel, said cross-piece also being disposed opposite said first pair of oppositely disposed lugs and comprising a wedge member pointedly extending toward said slot defined between said first pair of oppositely disposed lugs such that when said cross-piece is moved axially toward said base member, said wedge member will enter said slot defined between said first pair of oppositely disposed lugs and cause said first pair of oppositely disposed lugs to be moved radially outwardly so as to also engage said second surface of said support panel;

a fastener having a threaded shank portion extending through said base member and between said first pair of oppositely disposed lugs;

a cavity defined within said cross-piece; and nut means disposed within said cavity of said cross-piece for threadedly engaging said threaded shank portion of said fastener, whereupon rotation of said fastener and threaded engagement of said fastener and said nut means, said cross-piece of said foot portion will be caused to move axially toward said base member whereby said second pair of oppositely disposed lugs will be expanded radially outwardly so as to engage said second surface of said support panel, and said wedge member will be moved into said slot defined between said first pair of oppositely disposed lugs so as to force said first pair of oppositely disposed lugs to be moved radially outwardly so as to engage said second surface of said support panel.

8. The combination as set forth in claim 7, wherein:

said base member comprising said support portion and said first pair of oppositely disposed lugs, and said foot portion comprising said cross-piece, said wedge member, and said second pair of oppositely disposed lugs, comprise a one-piece plastic molded component.

9. The combination as set forth in claim 7, wherein:

said fastener and said nut means comprise metallic components.

10. The combination as set forth in claim 7, wherein:

each one of said second pair of oppositely disposed lugs comprises an external convexly curved portion which predisposes said second pair of oppositely disposed lugs toward said radially outward expansion thereof.

11. The combination as set forth in claim 10, wherein:

said external convexly curved portions of said second pair of oppositely disposed lugs have a constant thickness dimension.

12. The combination as set forth in claim 7, further comprising:

a hook member integrally connected to said base member for supporting an element to be mounted upon said support panel.

13. In combination, a support system for mounting a vehicle sun visor upon a support panel, comprising:

a support panel having an aperture defined therein;

a base member having a support portion for engaging a first surface of said support panel, and a first pair of oppositely disposed lugs having a slot defined therebetween;

a hook member integrally connected to said base member for supporting a vehicle sun visor;

a foot portion integral with said base member and extending axially away from said base member so as to be inserted through said aperture defined within said support panel;

said foot portion comprising a cross-piece and a second pair of oppositely disposed lugs integrally connected at first ends thereof to said base member and integrally connected at second opposite ends thereof to said cross-piece such that when said cross-piece is moved axially toward said base member, said second pair of oppositely disposed lugs will be expanded radially outwardly so as to engage a second surface of said support panel, said cross-piece also being disposed opposite said first pair of oppositely disposed lugs and comprising a wedge member pointedly extending toward said slot defined between said first pair of oppositely disposed lugs such that when said cross-piece is moved axially toward said base member, said wedge member will enter said slot defined between said first pair of oppositely disposed lugs and cause said first pair of oppositely disposed lugs to be moved radially outwardly so as to also engage said second surface of said support panel;

a fastener having a threaded shank portion extending through said base member and between said first pair of oppositely disposed lugs;

a cavity defined within said cross-piece; and nut means disposed within said cavity of said cross-piece for threadedly engaging said threaded shank portion of said fastener, whereupon rotation of said fastener and threaded engagement of said fastener and said nut means, said cross-piece of said foot portion will be caused to move axially toward said base member whereby said second pair of oppositely disposed lugs will be expanded radially outwardly so as to engage said second surface of said support panel, and said wedge member will be moved into said slot defined between said first pair of oppositely disposed lugs so as to force said first pair of oppositely disposed lugs to be moved radially outwardly so as to engage said second surface of said support panel.

14. The combination as set forth in claim 13, wherein:

said hook member has a substantially U-shaped recess portion for housing a pivotal axle of a sun visor.

15. The combination as set forth in claim 13, wherein:

said base member comprising said support portion and said first pair of oppositely disposed lugs, and said foot portion comprising said cross-piece, said wedge member, and said second pair of oppositely disposed lugs, comprise a one-piece plastic molded component.

16. The combination as set forth in claim 13, wherein:

said fastener and said nut means comprise metallic components.

17. The combination as set forth in claim 13, wherein:

each one of said second pair of oppositely disposed lugs comprises an external convexly curved portion which predisposes said second pair of oppositely disposed lugs toward said radially outward expansion thereof.

18. The combination as set forth in claim 17, wherein:

said external convexly curved portions of said second pair of oppositely disposed lugs have a constant thickness dimension.

* * * * *